(12) United States Patent
Lee et al.

(10) Patent No.: US 9,317,896 B2
(45) Date of Patent: Apr. 19, 2016

(54) IMAGE INTERPOLATION METHOD AND APPARATUS

(75) Inventors: Tammy Lee, Seoul (KR); Woo-Jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 13/809,364

(22) PCT Filed: Jul. 11, 2011

(86) PCT No.: PCT/KR2011/005065
§ 371 (c)(1),
(2), (4) Date: Mar. 1, 2013

(87) PCT Pub. No.: WO2012/005558
PCT Pub. Date: Jan. 12, 2012

(65) Prior Publication Data
US 2013/0156346 A1    Jun. 20, 2013

Related U.S. Application Data

(60) Provisional application No. 61/362,824, filed on Jul. 9, 2010.

(51) Int. Cl.
| | |
|---|---|
| *G06T 3/40* | (2006.01) |
| *H04N 7/01* | (2006.01) |
| *H04N 19/176* | (2014.01) |
| *H04N 19/117* | (2014.01) |
| *H04N 19/157* | (2014.01) |
| *H04N 19/523* | (2014.01) |
| *H04N 19/59* | (2014.01) |

(52) U.S. Cl.
CPC ............ *G06T 3/4007* (2013.01); *H04N 7/0117* (2013.01); *H04N 7/0135* (2013.01); *H04N 19/117* (2014.11); *H04N 19/157* (2014.11); *H04N 19/176* (2014.11); *H04N 19/523* (2014.11); *H04N 19/59* (2014.11)

(58) Field of Classification Search
None
See application file for complete search history.

(56) References Cited

U.S. PATENT DOCUMENTS

| | | | |
|---|---|---|---|
| 6,950,469 B2 * | 9/2005 | Karczewicz et al. | .... 375/240.17 |
| 7,349,473 B2 | 3/2008 | Hallapuro et al. | |
| 8,036,273 B2 | 10/2011 | Karczewicz et al. | |
| 9,100,650 B2 | 8/2015 | Kanou et al. | |

(Continued)

FOREIGN PATENT DOCUMENTS

| | | |
|---|---|---|
| CN | 1666429 A | 9/2005 |
| CN | 101232622 A | 7/2008 |

(Continued)

OTHER PUBLICATIONS

Guo et. al.: An Optimized MC Interpolation Architecture for HEVC, 2012 IEEE.*

(Continued)

*Primary Examiner* — Stephen R Koziol
*Assistant Examiner* — Pinalben Patel
(74) *Attorney, Agent, or Firm* — Sughrue Mion, PLLC

(57) ABSTRACT

An image interpolation method and apparatus are provided. The image interpolation method includes: selecting different interpolation filters according to locations of sub pixels between integer pixels; and generating sub pixel values at the locations of the sub pixels using the selected interpolation filters.

1 Claim, 14 Drawing Sheets

(56) References Cited

U.S. PATENT DOCUMENTS

| | | | |
|---|---|---|---|
| 2003/0169931 A1* | 9/2003 | Lainema | 382/236 |
| 2004/0062307 A1 | 4/2004 | Hallapuro et al. | |
| 2004/0213470 A1* | 10/2004 | Sato et al. | 382/239 |
| 2004/0223548 A1 | 11/2004 | Kato et al. | |
| 2006/0294171 A1 | 12/2006 | Bossen et al. | |
| 2007/0081743 A1* | 4/2007 | Kim | 382/299 |
| 2008/0247467 A1* | 10/2008 | Rusanovskyy et al. | 375/240.16 |
| 2009/0129465 A1* | 5/2009 | Lai et al. | 375/240.02 |
| 2009/0257503 A1* | 10/2009 | Ye et al. | 375/240.17 |
| 2009/0257668 A1* | 10/2009 | Ye et al. | 382/233 |
| 2010/0111182 A1* | 5/2010 | Karczewicz et al. | 375/240.16 |
| 2010/0135398 A1* | 6/2010 | Wittmann et al. | 375/240.16 |
| 2010/0226432 A1* | 9/2010 | Wittmann et al. | 375/240.12 |
| 2011/0243471 A1* | 10/2011 | Alshina | H04N 19/48 382/248 |
| 2012/0033728 A1* | 2/2012 | Cho et al. | 375/240.03 |
| 2012/0069906 A1 | 3/2012 | Sato | |
| 2012/0134425 A1* | 5/2012 | Kossentini | H04N 19/117 375/240.25 |
| 2013/0182780 A1* | 7/2013 | Alshin et al. | 375/240.29 |
| 2014/0153844 A1* | 6/2014 | Jeon | H04N 19/82 382/300 |
| 2014/0369402 A1* | 12/2014 | Minoo et al. | 375/240.02 |
| 2015/0010082 A1* | 1/2015 | Iwata | H04N 19/521 375/240.16 |

FOREIGN PATENT DOCUMENTS

| | | |
|---|---|---|
| EP | 2157799 A1 * | 2/2010 |
| EP | 2592833 A2 | 5/2013 |
| JP | 2005532725 A | 10/2005 |
| JP | 2009296154 A | 12/2009 |
| KR | 1020050018948 A | 2/2005 |
| KR | 1020080041935 A | 5/2008 |
| WO | 2009126936 A1 | 10/2009 |
| WO | 2010143583 A1 | 12/2010 |
| WO | 2011121716 A1 | 10/2011 |

OTHER PUBLICATIONS

Zhou et. al.: A Hardware Efficient Dual-Standard VLSI Architecture for MC Interpolation in AVS and H.264, 2007 IEEE.*
International Search Report dated Feb. 28, 2012 from the International Searching Authority in counterpart international application No. PCT/KR/2011/005065.
Written Opinion dated Feb. 28, 2012 from the International Searching Authority in counterpart international application No. PCT/KR/2011/005065.
Communication dated Nov. 3, 2014, issued by the European Patent Office in counterpart European Application No. 11803844.7.
Communication dated Dec. 17, 2014, issued by the Intellectual Property Office of the Philippines Bureau of Patent in counterpart Philippine Application No. 1/2013/500061.
Ugur (Nokia) K et al., "Description of Video Coding Technology Proposal by Tandberg, Nokia, Ericsson", 1. JCT-VC Meeting; Apr. 15, 2010-Apr. 23, 2010, Dresden, (Joint Collaborative Team on Video Coding of ISO/IEC JTC1/SC29/WG11 and ITU-T SG.16), URL: http://wftp3.itu.int/av-arch/jctvc-site/,,No. JCTVC-A119, Apr. 12 2010, XP030009029, 33 pages total.
Li Y et al., "Local Adaptive Filter in Predictive Coding", Visual Communications and Image Processing, Jul. 12, 2005-Jul. 15, 2005, Beijing Jul. 12, 2005, Proc. of SPIE, vol. 5960, XP030081072, p. 2259-2266.
Thomas Wedi, "Results of Complexity and Coding Performance Investigations: Displacement Vector Resolution and Interpolation Filter Tap Size", 13. VCEG Meeting, Apr. 2, 2001-Apr. 4, 2001, Austin, Texas, US, (Videocoding Experts Group of ITU-T SG.16),, No. VCEG-M46, Jun. 12, 2001, XP030003253, 8 pages total.
Communication dated Jun. 12, 2015, issued by the State Intellectual Property Office of P.R. China in counterpart Chinese Application No. 201180043659.X.
Communication dated Jul. 14, 2015, issued by the Japanese Intellectual Property Office in counterpart Japanese Application No. 2013-519579.
Ken McCann et al.; "Samsung's Response to the Call for Proposals on Video Compression Technology", Joint Collaborative Team on Video Coding (JCT-VC) of ITU-T SG16 WP3 and ISO/IEC JCT1/SC29/WG11, 1st Meeting: Dresden, DE, Apr. 2010, JCTVC-A124, p. 1-15.
Takeshi Chujoh et al.; "Description of Video Coding Technology Proposal by Toshiba", Joint Collaborative Team on Video Coding (JCT-VC) of ITU-T SG16 WP3 and ISO/IEC JTC1/SC29/WG11,1st Meeting: Dresden, DE,Apr. 2010, JCTVC-A117R1,p. 1-6.
Marta Karczewicz et al.; "Video Coding Technology Proposal by Qualcomm Inc.", Joint Collaborative Team on Video Coding (JCT-VC) of ITU-T SG16 WP3 and ISO/IEC JTC1/SC29/WG11, 1st Meeting: Dresden, DE,Apr. 5, 2010, JCTVC-A121,pp. 1-7.
Communication dated Aug. 14, 2015, issued by the Intellectual Property Corporation of Malaysia in counterpart Malaysian Application No. PI 2013000071.
Communication dated Jan. 26, 2016 issued by Japanese Intellectual Property Office in counterpart Japanese Application No. 2013-519579, 7 pages In Japanese and English.

* cited by examiner

IMAGE INTERPOLATION METHOD AND APPARATUS

CROSS-REFERENCE TO RELATED APPLICATIONS

This application is a National Stage application under 35 U.S.C. §371 of PCT/KR2011/005065 filed on Jul. 11, 2011, which claims the benefit of U.S. Provisional Application No. 61/362,824, filed on Jul. 9, 2010 in the United States Patent and Trademark Office, the disclosures of which are incorporated herein by reference in their entirety.

BACKGROUND

1. Field

Exemplary embodiments relate to a method and apparatus for interpolating an image, and more particularly, to a method and apparatus for interpolating pixel values of sub pixels between integer pixels.

2. Description of Related Art

In an image encoding/decoding method, one picture is divided into a plurality of macro blocks so as to encode an image. Then, each of the plurality of macro blocks is prediction-encoded by performing inter prediction or intra prediction thereon.

Inter prediction is a method of compressing an image by removing a temporal redundancy between pictures. A representative example of inter prediction is motion-estimation encoding. In motion-estimation encoding, each block of a current picture is predicted by using at least one reference picture. A reference block that is the most similar to a current block is searched for in a predetermined search range by using a predetermined evaluation function.

The current block is predicted based on the reference block, a residual block is obtained by subtracting a predicted block, which is the result of predicting, from the current block, and then the residual block is encoded. In this case, in order to precisely predict the current block, sub pixels that are smaller than integer pixels are generated by performing interpolation in a search range of the reference picture, and inter prediction is performed based on a reference picture having precision of the sub pixels.

SUMMARY

Exemplary embodiments relate to an image interpolation method and apparatus for generating pixel values of sub pixel units by interpolating pixel values of integer pixel units.

According to an aspect of an exemplary embodiment, one of a plurality of interpolation filters having different characteristics is set according to locations of sub pixels, the set interpolation filter is selected according to the locations of the sub pixels, and interpolation of the sub pixels is performed.

According to an aspect of another exemplary embodiment, there is provided an image interpolation method including: selecting an interpolation filter among different interpolation filters according to locations of sub pixels between integer pixels; and generating sub pixel values at the locations of the sub pixels using the selected interpolation filters.

According to an aspect of another exemplary embodiment, there is provided an image interpolation method including: setting interpolation filters having different characteristics to interpolate sub pixels between integer pixels according to a size of a block including the integer pixels and locations of the sub pixels and selecting an interpolation filter used to interpolate the sub pixels according to the size of the block and the locations of the sub pixels; and generating sub pixel values at the locations of the sub pixels using the selected interpolation filter.

According to an aspect of another exemplary embodiment, there is provided an image interpolation apparatus including: an interpolation filter selector for selecting an interpolation filter among different interpolation filters according to locations of sub pixels between integer pixels; and an interpolator for generating sub pixel values at the locations of the sub pixels using the selected interpolation filters.

According to an aspect of another exemplary embodiment, there is provided an image interpolation apparatus including: an interpolation filter selector for setting interpolation filters having different characteristics to interpolate sub pixels between integer pixels according to a size of a block including the integer pixels and locations of the sub pixels and selecting an interpolation filter used to interpolate the sub pixels according to the size of the block and the locations of the sub pixels; and an interpolator for generating sub pixel values at the locations of the sub pixels using the selected interpolation filter.

Accordingly, an image may be more precisely interpolated, thereby encoding and decoding the image may be performed at high compression efficiency.

DETAILED DESCRIPTION OF EXEMPLARY EMBODIMENTS

Hereinafter, the inventive concept will be described more fully with reference to the accompanying drawings, in which exemplary embodiments are shown.

Figure 1:
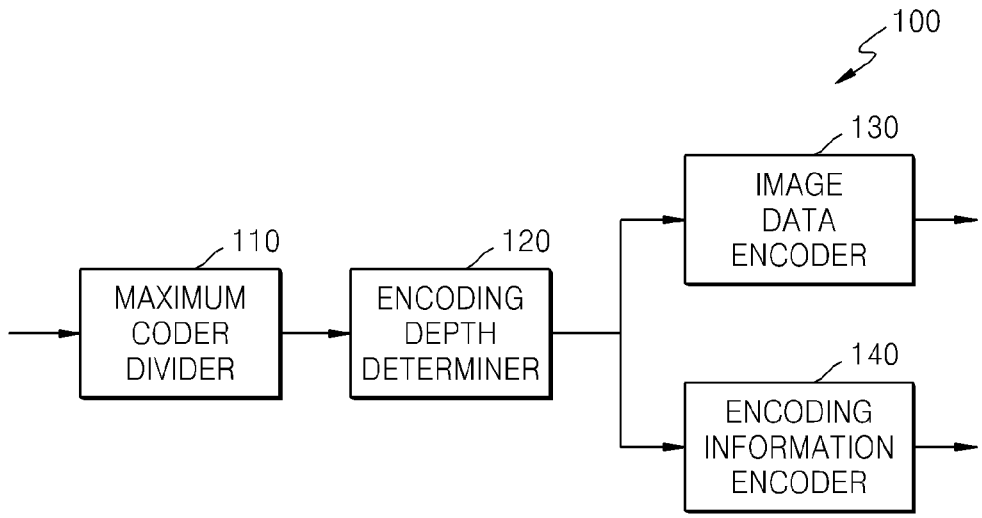
FIG. 1 is a block diagram of an apparatus for encoding an image according to an aspect of an exemplary embodiment.

FIG. 1 is a block diagram of an apparatus 100 for encoding an image, according to an aspect of an exemplary embodiment. Referring to FIG. 1, the apparatus 100 for encoding an image includes a maximum coding unit divider 110, an encoding depth determiner 120, an image data encoder 130, and an encoding information encoder 140.

The maximum coding unit divider 110 may divide a current frame or slice based on a maximum coding unit that is a coding unit of the largest size. That is, the maximum coding unit divider 110 may divide the current frame or slice into at least one maximum coding unit.

According to an aspect of an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a $k^{th}$ depth may include a plurality of sub coding units of a depth greater than k.

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, according to an aspect of an exemplary embodiment, a different maximum image coding unit and a different maximum depth are set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths, and the sub coding units having different sizes, which are included in the maximum coding unit, may be predicted or transformed based on processing units having different sizes. Transformation is a process to convert coefficients of spatial domain into frequency domain such as discrete cosine transform (DCT) or Karhunen Loever Transform (KLT).

In other words, the apparatus 100 for encoding an image may perform a plurality of processing operations for image encoding based on processing units having various sizes and various shapes. To encode image data, processing operations, such as at least one of prediction, transform, and entropy encoding, are performed, wherein processing units having the same size or different sizes may be used for the processing operations, respectively.

For example, the apparatus 100 for encoding an image may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of the height and width of a coding unit is equally divided by two. Hereinafter, a processing unit, which is the base of prediction, is defined as a 'prediction unit'.

A prediction mode may be at least one from among an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Further, the skip mode may be performed for only a prediction unit having the size of 2N×2N. If a plurality of prediction units exist in a coding unit, the prediction mode with the least encoding errors may be selected after performing prediction for every prediction unit.

Alternatively, the apparatus 100 for encoding an image may perform transform on image data, based on a processing unit having a different size from a coding unit. For the transform in the coding unit, the transform may be performed based on a processing unit having a size equal to or smaller than that of the coding unit. Hereinafter, a processing unit, which is the base of transform, is defined as a 'transform unit'.

The encoding depth determiner 120 may determine sub coding units included in a maximum coding unit by using RD optimization based on a Lagrangian multiplier. In other words, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be information, e.g., flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode must be determined for each sub coding unit, information about at least one encoding mode may be determined for one maximum coding unit.

The apparatus 100 for encoding an image may generate sub coding units by equally dividing both the height and width of a maximum coding unit by two according to an increase of depth. That is, when the size of a coding unit of a $k^{th}$ depth is 2N×2N, the size of a coding unit of a $(k+1)^{th}$ depth is N×N.

Accordingly, the apparatus 100 for encoding an image may determine an optimal division shape for each maximum coding unit, based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
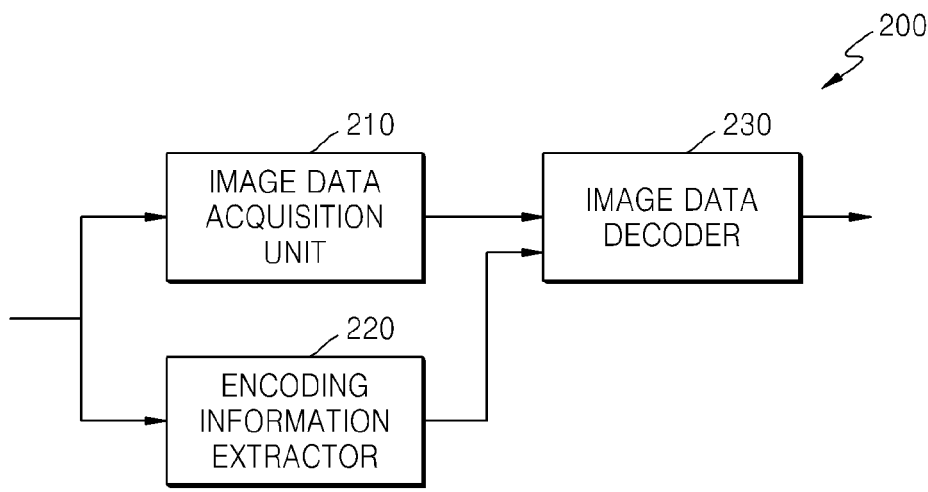
FIG. 2 is a block diagram of an apparatus for decoding an image according to an aspect of an exemplary embodiment.

FIG. 2 is a block diagram of an apparatus 200 for decoding an image according to an aspect of an exemplary embodiment. Referring to FIG. 2, the apparatus 200 for decoding an image includes an image data acquisition unit 210, an encoding information extractor 220, and an image data decoder 230.

The image data acquisition unit 210 acquires image data according to maximum coding units by parsing a bitstream received by the apparatus 200 for decoding an image, and outputs the image data to the image data decoder 230. The image data acquisition unit 210 may extract information about maximum coding units of a current frame or slice from a header of the current frame or slice. In other words, the image data acquisition unit 210 divides the bitstream according to the maximum coding units so that the image data decoder 230 may decode the image data according to the maximum coding units.

The encoding information extractor 220 extracts information about a maximum coding unit, a maximum depth, a division shape of the maximum coding unit, an encoding mode of sub coding units from the header of the current frame by parsing the bitstream received by the apparatus 200 for decoding an image. The information about the division shape and the information about the encoding mode are provided to the image data decoder 230.

The information about the division shape of the maximum coding unit may include information about sub coding units having different sizes according to depths and included in the maximum coding unit, and may be information (e.g., flag information) indicating whether each coding unit is divided. The information about the encoding mode may include information about a prediction unit according to sub coding units, information about a prediction mode, and information about a transform unit.

The image data decoder 230 restores the current frame by decoding image data of each maximum coding unit, based on the information extracted by the encoding information extractor 220.

The image data decoder 230 may decode the sub coding units included in a maximum coding unit, based on the information about the division shape of the maximum coding unit. The decoding may include intra prediction, inter prediction that includes motion compensation, and inverse transform.

The image data decoder 230 may perform intra prediction or inter prediction based on information about a prediction unit and information about a prediction mode in order to predict a prediction unit. The image data decoder 230 may also perform inverse transform for each sub coding unit based on information about a transform unit of a sub coding unit.

Figure 3:
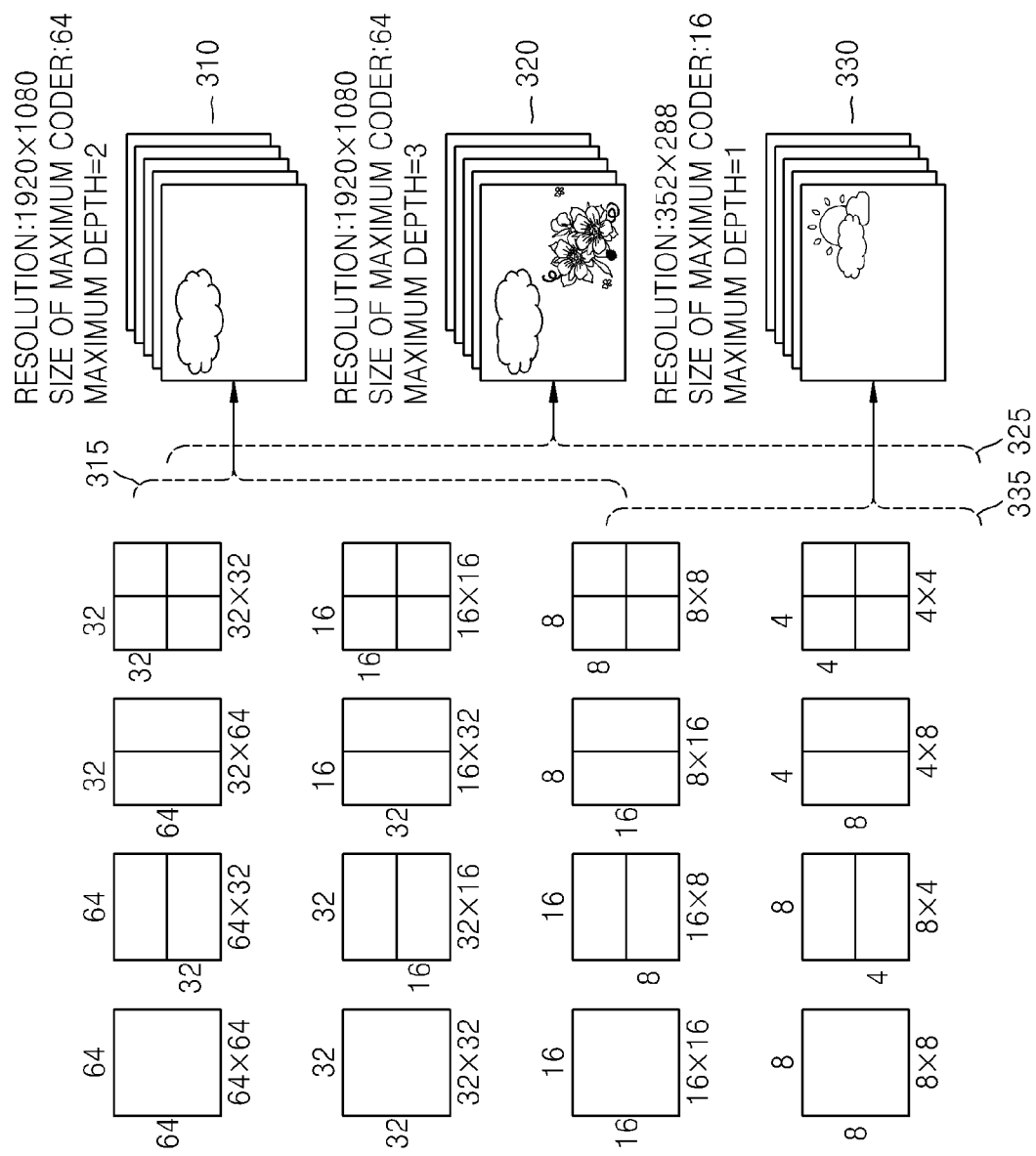
FIG. 3 illustrates hierarchical coding units according to an aspect of an exemplary embodiment.

FIG. 3 illustrates hierarchical coding units according to an aspect of an exemplary embodiment. Referring to FIG. 3, the hierarchical coding units may include coding units whose width and heights are 64×64, 32×32, 16×16, 8×8, and 4×4. Besides these coding units having perfect square shapes, coding units whose width and heights are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 1.

When the resolution is high or the amount of data is great, a maximum size of a coding unit may be relatively great to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase of a depth.

On the other hand, since the maximum depth of the image data 330 is 1, a coding unit 335 of the image data 330 may include a maximum coding unit whose longer axis size is 16 and coding units whose longer axis sizes are 8 and 4, according to an increase of a depth.

However, since the maximum depth of the image data 320 is 3, a coding unit 325 of the image data 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, the current embodiment is suitable for encoding an image including more minute scenes.

Figure 4:
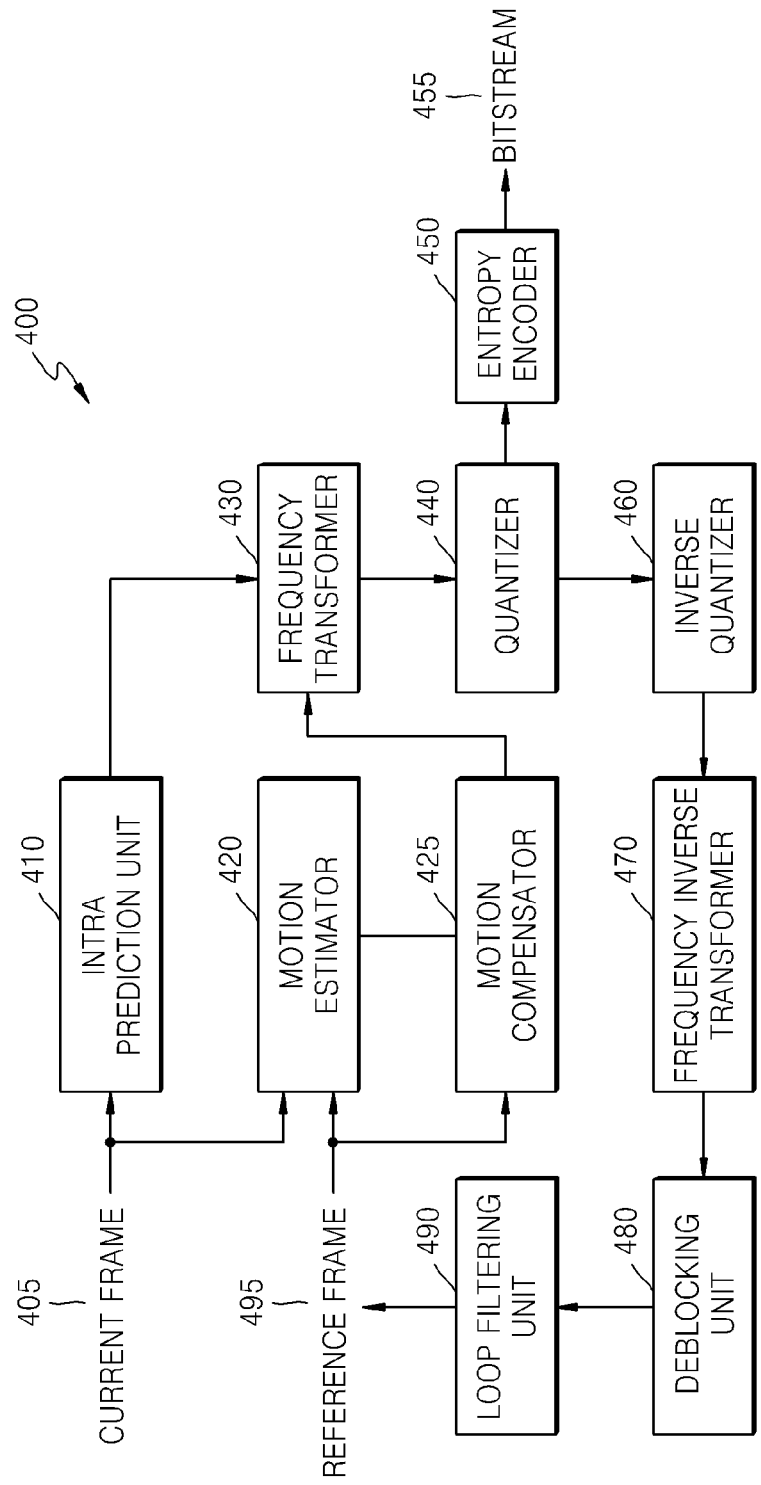
FIG. 4 is a block diagram of an image encoder based on a coding unit, according to an aspect of an exemplary embodiment.

FIG. 4 is a block diagram of an image encoder 400 based on a coding unit, according to an aspect of an exemplary embodiment. An intra prediction unit 410 performs intra prediction on prediction units of the intra mode in a current frame 405, and a motion estimator 420 and a motion compensator 425 perform inter prediction and motion compensation on prediction units of the inter mode by using the current frame 405 and a reference frame 495.

Residual values are generated based on the prediction units output from the intra prediction unit 410, the motion estimator 420, and the motion compensator 425, and are then output as quantized transform coefficients by passing through a transformer 430 and a quantizer 440.

The quantized transform coefficients are restored to the residual values by passing through an inverse quantizer 460 and an inverse transformer 470, are post-processed by passing through a deblocking unit 480 and a loop filtering unit 490, and are then output as the reference frame 495. The quantized transform coefficients may be output as a bitstream 455 by passing through an entropy encoder 450.

To perform encoding based on an encoding method according to an aspect of an exemplary embodiment, all components of the image encoder 400, i.e., the intra prediction unit 410, the motion estimator 420, the motion compensator 425, the transformer 430, the quantizer 440, the entropy encoder 450, the inverse quantizer 460, the inverse transformer 470, the deblocking unit 480, and the loop filtering unit 490, may perform image encoding processes, based on a maximum coding unit, sub coding units according to depths, a prediction unit, and a transform unit.

Figure 5:
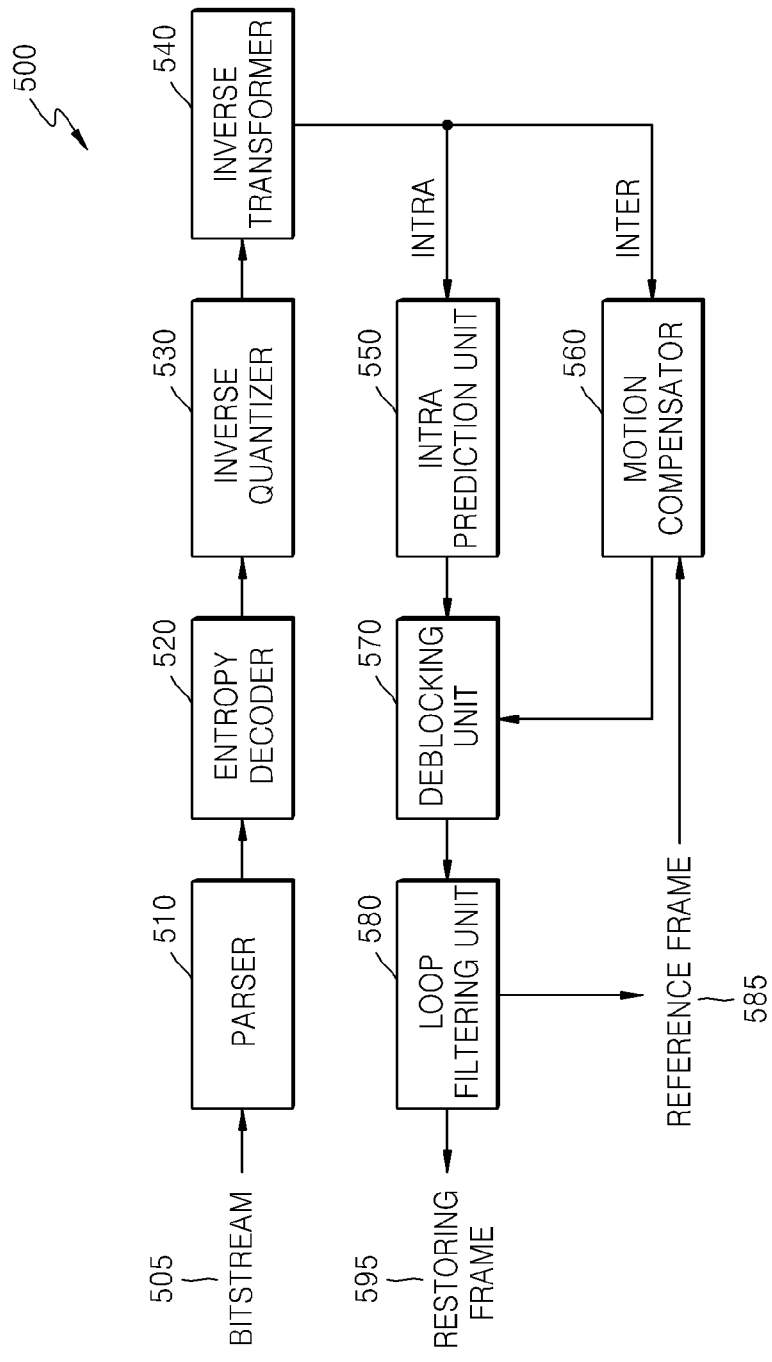
FIG. 5 is a block diagram of an image decoder based on a coding unit, according to an aspect of an exemplary embodiment.

FIG. 5 is a block diagram of an image decoder 500 based on a coding unit, according to an aspect of an exemplary embodiment. Referring to FIG. 5, a bitstream 505 is parsed by a parser 510 in order to obtain encoded image data to be decoded and encoding information which is necessary for decoding. The encoded image data is output as inverse-quantized data by passing through an entropy decoder 520 and an inverse quantizer 530, and is restored to residual values by passing through an inverse transformer 540. The residual values are restored according to coding units by being added to an intra prediction result of an intra prediction unit 550 or a motion compensation result of a motion compensator 560 by using a reference frame 585. The restored coding units are used for prediction of next coding units or a next frame by passing through a deblocking unit 570 and a loop filtering unit 580 to generate a restoring frame 595.

To perform decoding based on a decoding method according to an aspect of an exemplary embodiment, all components of the image decoder 500, i.e., the parser 510, the entropy decoder 520, the inverse quantizer 530, the inverse transformer 540, the intra prediction unit 550, the motion compensator 560, the deblocking unit 570, and the loop filtering unit 580, may perform image decoding processes based on a maximum coding unit, sub coding units according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
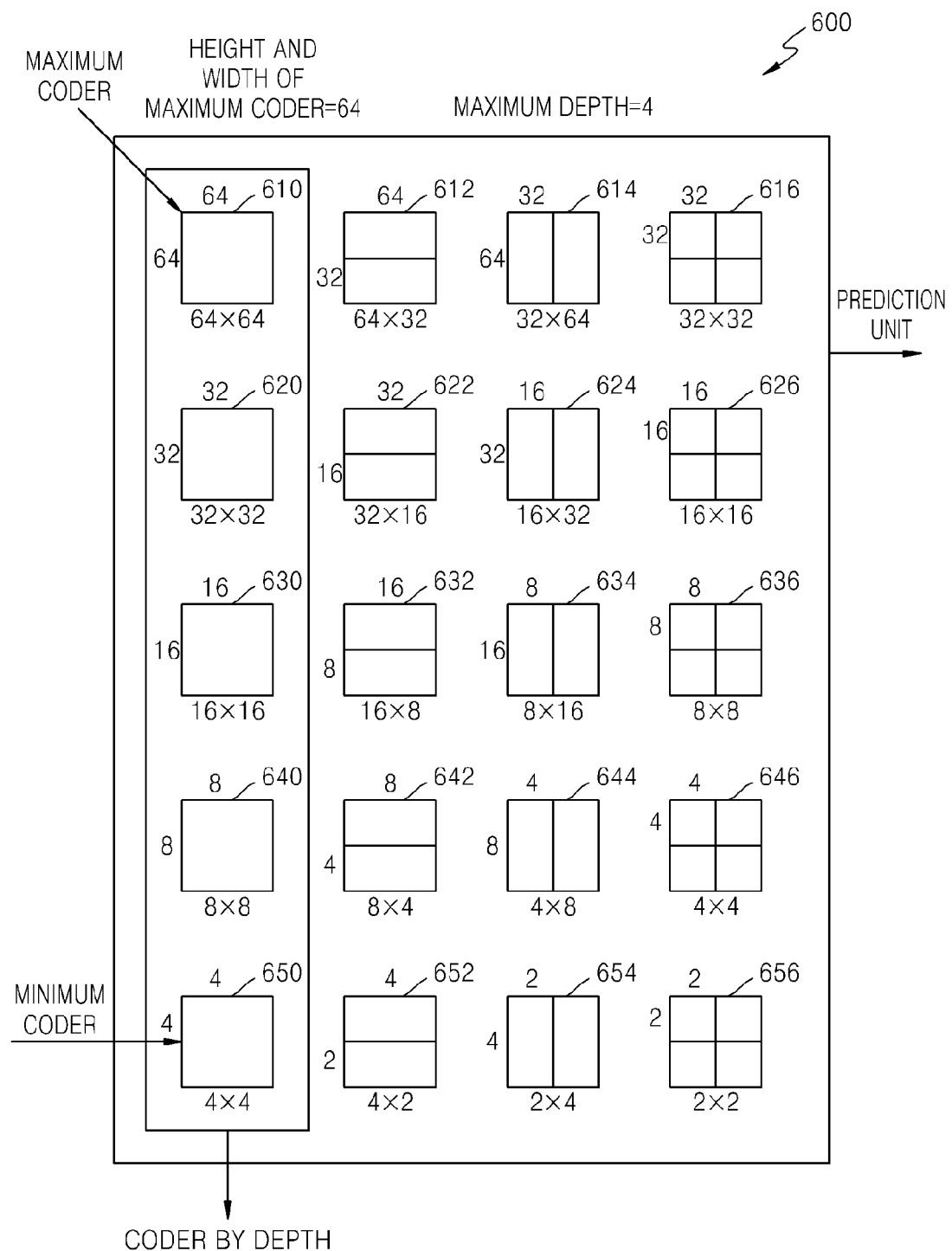
FIG. 6 illustrates a maximum coding unit, a sub coding unit, and a prediction unit, according to an aspect of an exemplary embodiment.

FIG. 6 illustrates a maximum coding unit, a sub coding unit, and a prediction unit, according to an aspect of an exemplary embodiment. The apparatus 100 for encoding an image illustrated in FIG. 1 and the apparatus 200 for decoding an image illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum coding unit 610 whose height and width are 64 and maximum depth is 4. A depth increases along a vertical axis of the hierarchical coding unit structure 600, and as a depth increases, the heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit, and the minimum coding unit may be divided into prediction units, each of which is less than the minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a minimum coding unit and a coding unit of a maximum depth. A prediction unit of the coding unit 650 having a maximum depth may be a prediction unit 650 whose size is 4×4, a prediction unit 652 having a size of 4×2, a prediction unit 654 having a size of 2×4, or a prediction unit 656 having a size of 2×2, which has a size smaller than the coding unit 650.

Figure 7:
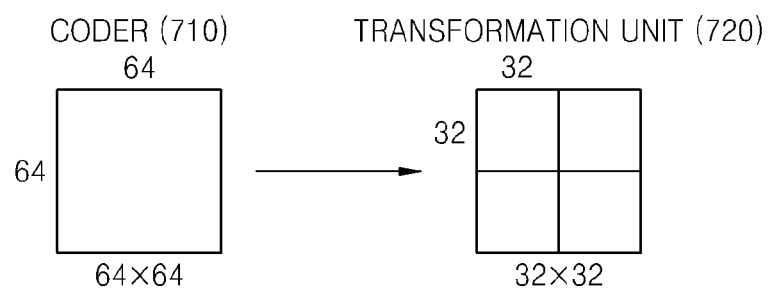
FIG. 7 illustrates a coding unit and a transform unit, according to an aspect of an exemplary embodiment.

FIG. 7 illustrates a coding unit and a transform unit, according to an aspect of an exemplary embodiment. The apparatus 100 for encoding an image illustrated in FIG. 1 and the apparatus 200 for decoding an image illustrated in FIG. 2 perform encoding and decoding with a maximum coding unit itself or with sub coding units, which are equal to or smaller than the maximum coding unit, divided from the maximum coding unit. In the encoding and decoding process, the size of a transform unit for transform may be selected to be no larger than that of a corresponding coding unit. For example, referring to FIG. 7, when a current coding unit 710 has the size of 64×64, transform may be performed using a transform unit 720 having the size of 32×32.

Figure 8A:
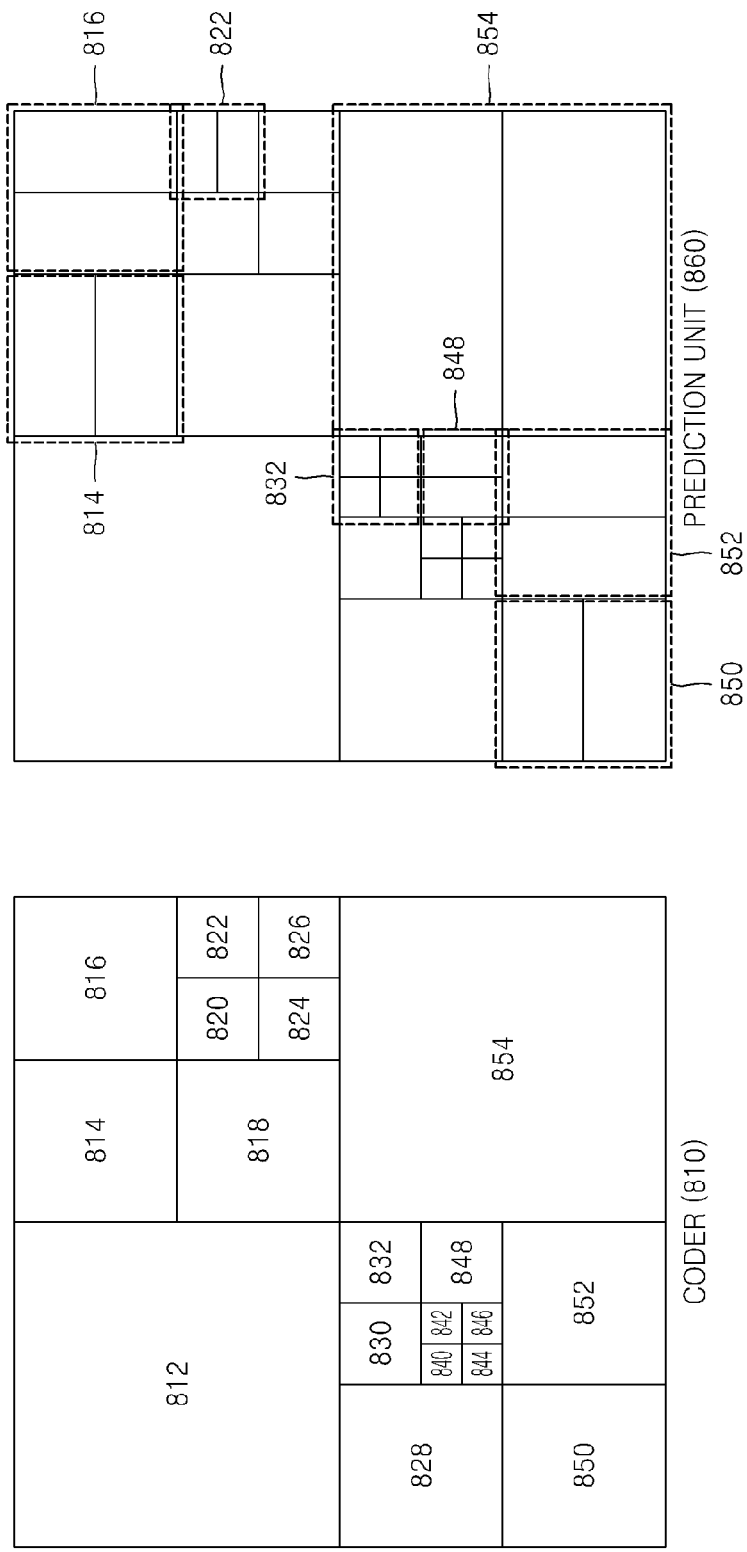
FIGS. 8A and 8B illustrate division shapes of a coding unit, a prediction unit, and a transform unit, according to an aspect of an exemplary embodiment.
Figure 8B:
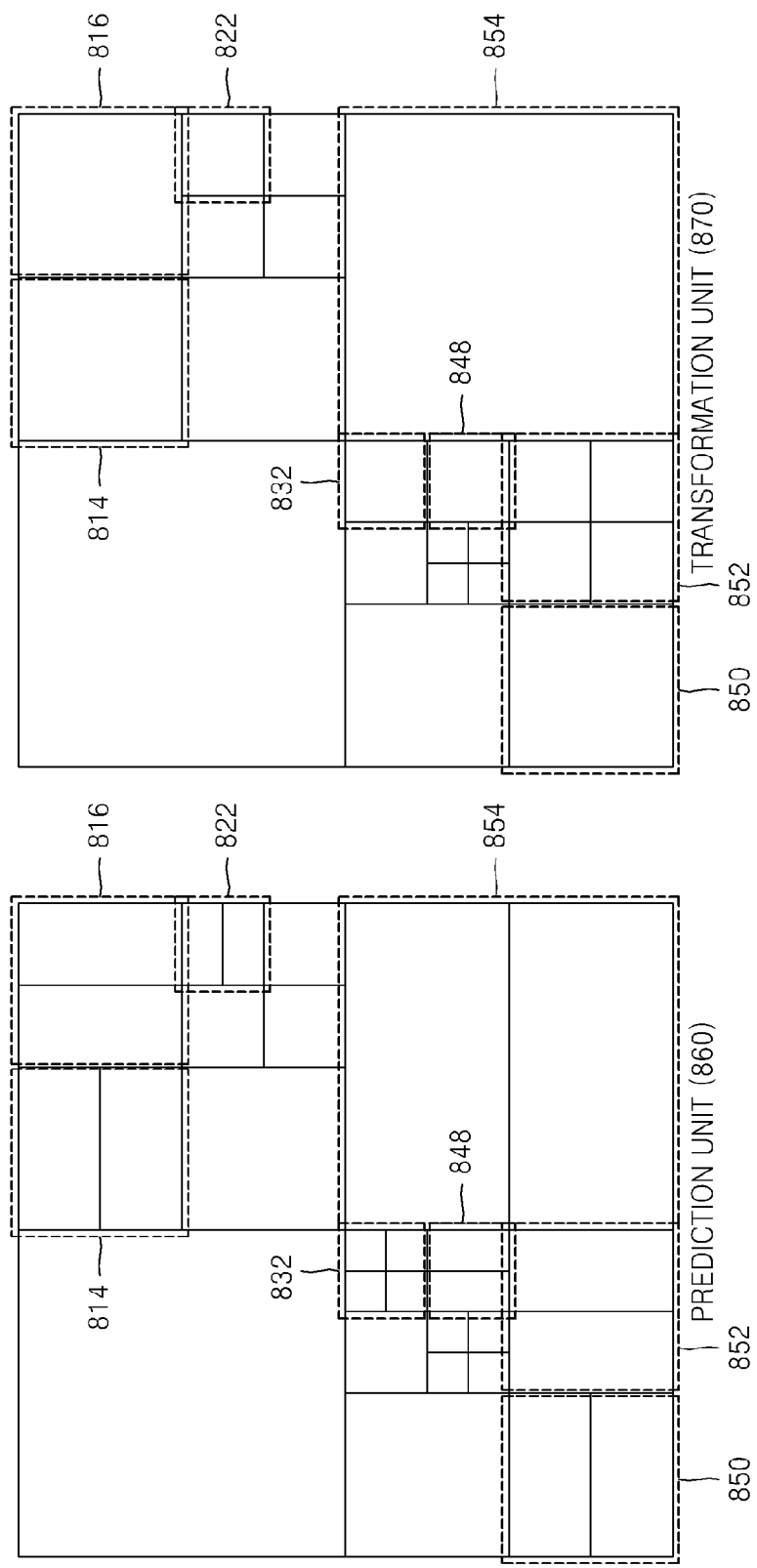

FIGS. 8A through 8B illustrate division shapes of a coding unit, a prediction unit, and a transform unit, according to an aspect of an exemplary embodiment. Specifically, FIGS. 8A illustrates a coding unit and a prediction unit according to an aspect of an exemplary embodiment.

Left side of FIG. 8A shows a division shape selected by the apparatus 100 for encoding an image illustrated in FIG. 1, in order to encode a maximum coding unit 810. The apparatus 100 for encoding an image divides the maximum coding unit 810 into various shapes, performs encoding thereon, and selects an optimal division shape by comparing encoding results of the various division shapes with each other based on R-D costs. When it is optimal that the maximum coding unit 810 is encoded as it is, the maximum coding unit 810 may be encoded without dividing the maximum coding unit 810 as illustrated in FIGS. 8A and 8B.

Referring to left side of FIG. 8A, the maximum coding unit 810 whose depth is 0 is encoded by dividing it into sub coding units whose depths are equal to or greater than 1. That is, the maximum coding unit 810 is divided into four sub coding units whose depths are 1. For example, sub coding units 812 and 854 have a depth of 1. All or some of the sub coding units whose depths are 1 may be divided into sub coding units whose depths are 2. For example, sub coding units 814, 816,

818, 828, 850 and 852 have a depth of 2. Further, all or some of the sub coding units whose depths are 2 may be divided into sub coding units whose depths are 3. For example, sub coding units 820, 822, 824, 826, 830, 832 and 848 have a depth of 3. In addition, all or some of the sub coding units whose depths are 3 may be divided into sub coding units whose depths are 4. For example, sub coding units 840, 842, 844 and 846 have a depth of 4.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

Right side of FIG. 8A shows a division shape of a prediction unit for the maximum coding unit 810. Referring to right side of FIG. 8A, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some sub coding units 814, 816, 850, and 852 from among sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

FIG. 8B illustrates a prediction unit and a transform unit, according to an aspect of an exemplary embodiment.

Left side of FIG. 8B shows a division shape of a prediction unit for the maximum coding unit 810 shown in right side of FIG. 8A, and right side of FIG. 8B shows a division shape of a transform unit of the maximum coding unit 810.

Referring to right side of FIG. 8B, a division shape of a transform unit 870 may be set differently from the prediction unit 860.

For example, even though a prediction unit for the coding unit 854 whose depth is 1 is selected with a shape whereby the height of the coding unit 854 is equally divided by two, a transform unit may be selected with the same size as the coding unit 854. Likewise, even though prediction units for coding units 814 and 850 whose depths are 2 are selected with a shape whereby the height of each of the coding units 814 and 850 is equally divided by two, a transform unit may be selected with the same size as the original size of each of the coding units 814 and 850.

A transform unit may be selected with a smaller size than a prediction unit. For example, when a prediction unit for the coding unit 852 whose depth is 2 is selected with a shape whereby the width of the coding unit 852 is equally divided by two, a transform unit may be selected with a shape whereby the coding unit 852 is equally divided by four in directions of height and width, which has a smaller size than the shape of the prediction unit.

An image interpolation process performed by the motion estimator 420 and the motion compensator 425 of the image encoder 400 of FIG. 4 and the motion compensator 560 of the image decoder 500 of FIG. 5 according to aspects of exemplary embodiments will now be described in detail below. The above-described prediction unit will now be referred to as a block below.

Figure 9:
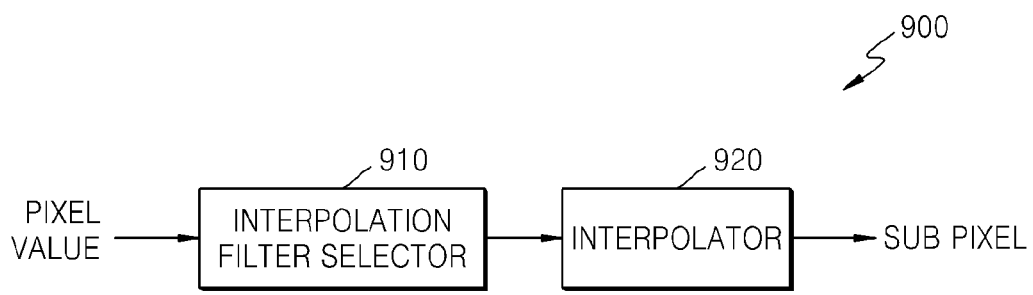
FIG. 9 is a block diagram of an image interpolation apparatus according to an aspect of an exemplary embodiment.

FIG. 9 is a block diagram of an image interpolation apparatus 900 according to an aspect of an exemplary embodiment.

Image interpolation may be used to convert an image having a low resolution to an image having a high resolution. Also, image interpolation may be used to convert an interlaced image to a progressive image or may be used to up-sample an image having a low resolution to a higher resolution. When the image encoder 400 of FIG. 4 encodes an image, the motion estimator 420 and the motion compensator 425 may perform inter prediction by using an interpolated reference frame. That is, referring to FIG. 4, an image having a high resolution may be generated by interpolating the reference frame 495, and motion estimation and compensation may be performed based on the image having the high resolution, thereby increasing the precision of inter prediction. Likewise, when the image decoder 500 of FIG. 5 decodes an image, the motion compensator 560 may perform motion compensation by using an interpolated reference frame, thereby increasing the precision of inter prediction. That is, the image interpolation apparatus 900 according to an aspect of an exemplary embodiment may be included in the motion estimator 420 and the motion compensator 425 of the image encoder 400 of FIG. 4 and the motion compensator 560 of the image decoder 500 of FIG. 5 or coupled thereto to operate.

Referring to FIG. 9, the image interpolation apparatus 900 according to an aspect of an exemplary embodiment may include an interpolation filter selector 910 and an interpolator 920.

The interpolation filter selector 910 previously sets interpolation filters that are to be applied according to locations of sub pixels that are to be interpolated from among a plurality of interpolation filters having different characteristics and outputs information regarding the set interpolation filters according to a location of a sub pixel that is to be currently interpolated. The interpolation filters that are selected by the interpolation filter selector 910 and applied to respective sub pixels may be interpolation filters previously set with respect to locations of sub pixels among interpolation filters having various characteristics such as different tap number, different tap coefficients, or different interpolation directions and shapes, etc. In more detail, the interpolation filter selector 910 may previously set interpolation filters that are to be applied according to a size of a block including interpolated pixels to apply the previously set interpolation filters according to a size of a block including pixels that are to be interpolated. That is, the interpolation filter selector 910 may previously set interpolation filters that are to be applied with respect to respective locations of sub pixels among a plurality of interpolation filters having different tap numbers, tap coefficients, interpolation directions and shapes according to a size of a block and output information regarding the interpolation filters according to the size of the block and the locations of the sub pixels that are input and are to be interpolated. For example, the interpolation filter selector 910 may previously set interpolation filters having the tap number proportional to a size of a block and having different characteristics with respect to the locations of the respective sub pixels, and output the set interpolation filters according to a size of a block and locations of sub pixels that are to be currently interpolated. Also, the interpolation filter selector 910 may previously set an interpolation direction regarding whether to use peripheral pixels in a horizontal direction, in a vertical direction, or in a diagonal direction during interpolation with respect to locations of sub pixels. Also, the interpolation filter selector 910 may previously set an interpolation shape regarding whether to use an interpolation filter in a 1D shape, an interpolation filter in a cross shape using the peripheral pixels in the vertical and horizontal directions, or an interpolation filter using peripheral pixels included in a mask with a size of a 2D m×n (m and n are integers) during interpolation with respect to locations of sub pixels.

The interpolator 920 generates sub pixel values at the locations of the sub pixels using the selected interpolation filters.

Figure 10:
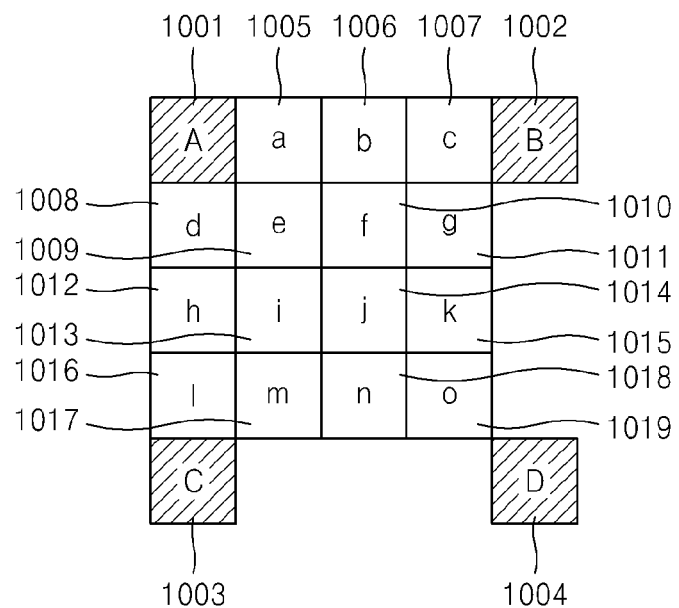
FIG. 10 is a reference view for explaining a process of selecting an interpolation filter for interpolating sub pixels according to an aspect of an exemplary embodiment.

FIG. 10 is a reference view for explaining a process of selecting an interpolation filter for interpolating sub pixels according to an aspect of an exemplary embodiment.

Referring to FIG. 10, the interpolation filter selector 910 selects one of different interpolation filters with respect to locations of sub pixels that are to be interpolated between an integer pixel A 1001, an integer pixel B 1002, an integer pixel C 1003, and an integer pixel D 1004. As described above, the interpolation filter selector 910 may previously set interpolation filters that are to be applied according to locations of sub pixels that are to be interpolated from among a plurality of interpolation filters having different characteristics and output information regarding the set interpolation filters according to a location of a sub pixel that is to be currently interpolated.

In more detail, the interpolation filter selector 910 may previously set interpolation filters that are to be applied with respect to respective locations of sub pixels among a plurality of interpolation filters having different tap numbers, tap coefficients, interpolation directions and shapes and select and output the set interpolation filters from the plurality of interpolation filters according to the locations of the sub pixels. For example, the interpolation filter selector 910 may previously set one of a 6 tap interpolation filter having a coefficient such as {8, −40, 160, 160, −40, 8 }/256, a 8 tap interpolation filter having a coefficient such as {−1,4,−11,40,40,−11,4,−1}/64, and a 12 tap interpolation filter having a coefficient such as {−1, 8, 16, 24, −48, 161, 161, −48, 24, −16, 8, −1}/256, as an interpolation filter for interpolating a ½ sub pixel b 1006 between the integer pixel A 1001 and the integer pixel B 1002 or a ½ sub pixel h 1012 between the integer pixel A 1001 and the integer pixel C1003, and output the set interpolation filter as interpolation filter information. Also, the interpolation filter selector 910 may previously set interpolation filters having different tap numbers according to a size of a block including integer pixels among a plurality of interpolation filters having different coefficients, and output interpolation filter information having tap numbers set according to the size of the block. For example, when the interpolation filter selector 910 has one of 16×16, 32×32, and 64×64 as a size of a current block, the interpolation filter selector 910 may set the 6 tap interpolation filter for interpolating pixels included in a block with the size of 16×16, the 8 tap interpolation filter for interpolating pixels included in a block with the size of 32×32, and the 12 tap interpolation filter for interpolating pixels included in a block with the size of 64×64, and output information regarding the interpolation filter set according to the size of the current block.

Also, the interpolation filter selector 910 may select one of a 6 tap interpolation filter having a coefficient such as {8, −32, 224, 72, −24, 8 }/256, a 7 tap interpolation filter having a coefficient such as {−1,4,−10,58,17,−5,1}/64, and a 12 tap interpolation filter having a coefficient such as {−1, 5, −12, 20, −40, 229, 76, −32, 16, −8, 4, 31 1}/256, as an interpolation filter for interpolating a ¼ sub pixel a 1005 between the integer pixel A 1001 and the integer pixel B 1002 or a ¼ sub pixel d 1008 between the integer pixel A 1001 and the integer pixel C1003.

Similarly, the interpolation filter selector 910 may use interpolation filters having coefficients that minor, i.e., are symmetrical to, coefficients of the interpolation filters used to interpolate the ¼ sub pixels a and d 1005 and 1008, as an interpolation filter for interpolating a ¼ sub pixel c 1007 between the integer pixel A 1001 and the integer pixel B1002 or a ¼ sub pixel l 1016 between the integer pixel A 1001 and the integer pixel C1003, in addition to the interpolation filters used to interpolate the ¼ sub pixels a and d 1005 and 1008. In particular, the interpolation filter selector 910 may previously select one of a 6 tap interpolation filter having the coefficient such as {8, −24, 72, 224, −32, 8 }/256 that is a symmetrical to the 6 tap interpolation filter having the coefficient such as {8, −32, 224, 72, −24, 8}/256, a 7 tap interpolation filter having the coefficient such as {1, −5, 17, 58, −10, 4, −1 }/64 that is a symmetrical to the 7 tap interpolation filter having the coefficient such as {−1,4,−10,58,17,−5,1}/64, and a 12 tap interpolation filter having the coefficient such as {−1, 4, −8, 16, −32, 76, 229, −40, 20, −12, 5, −1}/256 that is a symmetrical to the 12 tap interpolation filter having the coefficient such as {−1, 5, −12, 20, −40, 229, 76, −32, 16, −8, 4, −1}/256 to set an interpolation filter for interpolating sub pixels so that values of peripheral pixels closer to ¼ sub pixels that are currently interpolated may be well reflected to interpolation values.

The interpolation filter selector 910 may select one of the 6 tap interpolation filter having the coefficient such as {8, −40, 160, 160, −40, 8}/256, the 8 tap interpolation filter having the coefficient such as {−1,4,−11,40,40,−11,4,−1}/64, and the 12 tap interpolation filter having the coefficient such as {−1, 8, 16, 24, −48, 161, 161, −48, 24, −16, 8, −1}/256 to previously set the selected interpolation filter as an interpolation filter, as an interpolation filter for interpolating a ½ sub pixel j 1014 disposed in the center of the integer pixel A 1001, the integer pixel B 1002, the integer pixel C1003, and the integer pixel D 1004. The interpolator 920 interpolates a pixel value of the ½ sub pixel j 1014 by applying the selected interpolation filter to ½ sub pixels disposed in the same row and column as the ½ sub pixel j 1014. A detailed interpolation process of the ½ sub pixel j 1014 will be described with reference to FIG. 12.

The interpolation filter selector 910 may select one of the 6 tap interpolation filter having the coefficient such as {8, −40, 160, 160, −40, 8}/256, the 8 tap interpolation filter having the coefficient such as {−1,4,−11,40,40,−11,4,−1}/64, and the 12 tap interpolation filter having the coefficient such as {−1, 8, 16, 24, −48, 161, 161, −48, 24, −16, 8, −1}/256 to previously set the selected interpolation filter as an interpolation filter, as an interpolation filter for interpolating ½ sub pixels between integer pixels such as the ½ sub pixel b 1006 and the ½ sub pixel h 1012 when a ¼ sub pixel f 1010, a ¼ sub pixel i 1013, a ¼ sub pixel k 1015, and a ¼ sub pixel n 1018 in the vicinity of the ½ sub pixel j 1014 are interpolated. The interpolator 920 interpolates the ½ sub pixels by using the selected interpolation filter. The interpolation filter selector 910 again selects one of the 6 tap interpolation filter having the coefficient such as {8, −32, 224, 72, −24, 8 }/256, the 7 tap interpolation filter having the coefficient such as {−1,4,−10,58, 17,−5,1}/64, and the 12 tap interpolation filter having the coefficient such as {−1, 5, −12, 20, −40, 229, 76, −32, 16, −8, 4, −1}/256 to set the selected interpolation filter as an interpolation filter as an interpolation filter that is to be applied to the ½ sub pixels interpolated by the interpolator 920. The interpolator 920 again interpolates the ¼ sub pixel f 1010, the ¼ sub pixel i 1013, the ¼ sub pixel k 1015, and the ¼ sub pixel n 1018 by applying the interpolation filter selected for the ½ sub pixels. An interpolation process of the ¼ sub pixel f 1010, the ¼ sub pixel i 1013, the ¼ sub pixel k 1015, and the ¼ sub pixel n 1018 in the vicinity of the ½ sub pixel j 1014 will be described with reference to FIG. 13.

The interpolation filter selector 910 may select one of the 6 tap interpolation filter having the coefficient such as {8, −32, 224, 72, −24, 8 }/256, the 7 tap interpolation filter having the coefficient such as {−1,4,−10,58,17,−5,1}/64, and the 12 tap interpolation filter having the coefficient such as {−1, 5, −12, 20, −40, 229, 76, −32, 16, −8, 4, −1}/256 or one of the interpolation filters that are symmetrical to the coefficients of the 6, 7, and 12 tap interpolation filters to set the selected interpolation filter as an interpolation filter so as to interpolate a ¼ sub pixel e 1009, a ¼ sub pixel g 1011, a ¼ sub pixel m 1017, and a ¼ sub pixel o 1019. A detailed interpolation process will be described with reference to FIG. 14.

Figure 11:
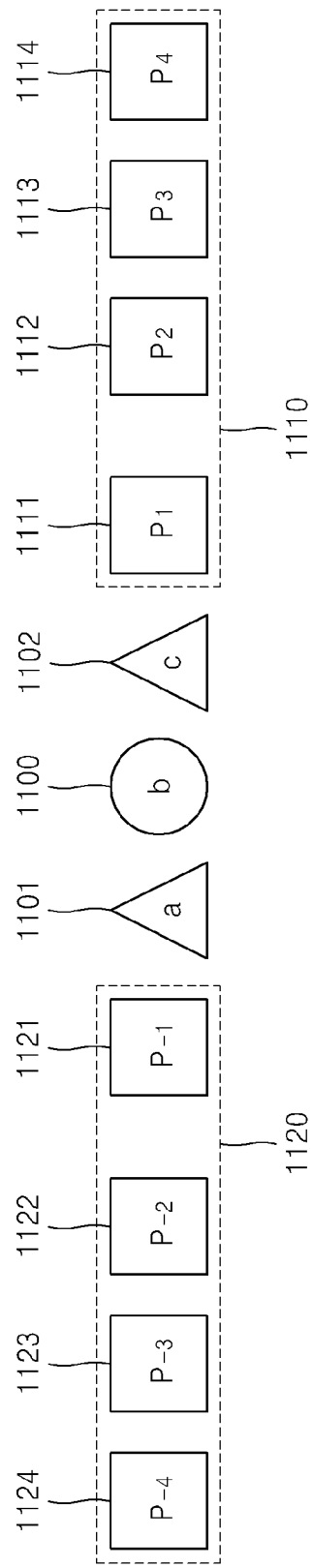
FIG. 11 is a reference view for explaining a process of interpolating sub pixels disposed at the same row or column as integer pixels according to an aspect of an exemplary embodiment.

FIG. 11 is a reference view for explaining a process of interpolating sub pixels disposed at the same row or column as integer pixels according to an aspect of an exemplary embodiment. In FIG. 11, sub pixels a, b, and c correspond to sub pixels a, b, and c of FIG. 10, respectively.

A process of interpolating a ½ sub pixel b 1100 will now be described.

The interpolation filter selector 910 selects a previously set interpolation filter from a 6 tap interpolation filter having a coefficient such as {8, −40, 160, 160, −40, 8}/256, a 8 tap interpolation filter having the coefficient such as {−1,4,−11, 40,40,−11,4,−1}/64, and a 12 tap interpolation filter having the coefficient such as {−1, 8, 16, 24, −48, 161, 161, −48, 24, −16, 8, −1 }/256 to interpolate the ½ sub pixel b 1100 between an integer pixel $P_{-1}$ 1101 and an integer pixel $P_1$ 1111. It is assumed that the 8 tap interpolation filter having the coefficient such as {−1,4,−11,40,40,−11,4,−1}/64 is set and selected as the interpolation filter for interpolating the ½ sub pixel b 1100. The interpolator 920 generates a pixel value of the ½ sub pixel b 1100 by applying the selected interpolation filter to integer pixels disposed at the same row as the ½ sub pixel b 1100. That is, the interpolator 920 generates the pixel value of the ½ sub pixel b 1100 by calculating a weighted sum of filter coefficients and pixel values of integer pixels 1120 on the left and integer pixels 1110 on the right that are disposed at the same row as the ½ sub pixel b 1100. More specifically, it is assumed that pixel values of integer pixels $P_{-4}$ to $P_4$ (1111 to 1114, 1121 to 1124) have Pi values as shown.

In this case, the interpolator 920 generates the pixel value of the ½ sub pixel b 1100 by calculating an equation:

$$b=\{P_{-4}*(-1)+P_{-3}*4+P_{-2}*(-11)+P_{-1}*40+P_1*40+P_2*\\(-11)+P_3*4+P_4*(-1)\}>>n \text{(n is an integer)}.$$

In the equation above, ">>" denotes a right shift operator and corresponds to doing the division by a value of $2^n$. A value of n may be determined based on tap numbers and tap coefficients. Except a difference that the ½ sub pixel h 1012 between the integer pixel A 1001 and the integer pixel C 1003 of FIG. 10 uses integer pixels disposed at the same column, the ½ sub pixel h 1012 may be interpolated in the same manner as the process of interpolating the ½ sub pixel b 1100.

A process of interpolating a ¼ sub pixel a 1101 will now be described.

The interpolation filter selector 910 selects a previously set interpolation filter from a 6 tap interpolation filter having the coefficient such as {8, −32, 224, 72, −24, 8 }/256, a 7 tap interpolation filter having the coefficient such as {−1,4,−10, 58,17,−5,1}/64, and a 12 tap interpolation filter having the coefficient such as {−1, 5, −12, 20, −40, 229, 76, −32, 16, −8, 4, −1}/256 to interpolate the ¼ sub pixel a 1101. It is assumed that the 7 tap interpolation filter having the coefficient such as {−1,4,−10,58,17,−5,1}/64 is selected as the interpolation filter for interpolating the ¼ sub pixel a 1101. The interpolator 920 generates a pixel value of the ¼ sub pixel a 1101 by applying the selected interpolation filter to integer pixels disposed at the same row as the ¼ sub pixel a 1101. That is, the interpolator 920 generates the pixel value of the ¼ sub pixel a 1101 by calculating a weighted sum of filter coefficients and pixel values of the integer pixels 1120 on the left and the integer pixels 1110 on the right that are disposed at the same row as the ¼ sub pixel a 1101. However, since the integer pixel $P_{-1}$ 1121 is closer to the ¼ sub pixel a 1101 than the integer pixel $P_1$ 1111, the interpolator 920 determines 4 integer pixels 1121 to 1124 on the left that are closer to the ¼ sub pixel a 1101 that is currently interpolated and 3 integer pixels $P_1$ 1111, $P_2$ 1112, and $P_3$ 1113 as integer pixels that are to be used for interpolation, and calculates a weighted sum of the integer pixels and coefficients. More specifically, the interpolator 920 generates the pixel value of the ¼ sub pixel a 1101 by calculating an equation $$b=\{P_{-4}*(-1)+P_{-3}*4+P_{-2}*(-10)+P_{-1}*58+P_1*17+P_2*\\(-5)+P_3*1\}>>n.$$

Similarly, the interpolation filter selector 910 selects and outputs a previously set interpolation filter from the 6 tap interpolation filter having the coefficient such as {−8, −32, 224, 72, −24, 8 }/256, the 7 tap interpolation filter having the coefficient such as {−1,4,−10,58,17,−5,1}/64, and the 12 tap interpolation filter having the coefficient such as {−1, 5, −12, 20, −40, 229, 76, −32, 16, −8, 4, −1}/256 to interpolate the ¼ sub pixel c 1102. It is assumed that the 7 tap interpolation filter having the coefficient such as {−1,4,−10,58,17,−5,1}/64 is selected as the interpolation filter for interpolating the ¼ sub pixel c 1102. The interpolator 920 generates a pixel value of the ¼ sub pixel c 1102 by applying the selected interpolation filter to integer pixels disposed at the same row as the ¼ sub pixel c 1102. The interpolator 920 determines 4 integer pixels 1111 to 1114 on the left that are closer to the ¼ sub pixel c 1102 that is currently interpolated and 3 integer pixels $P_{-1}$ 1121, $P_{-2}$ 1122, and $R_{-3}$ 1123 that is currently interpolated as integer pixels that are to be used for interpolation, and calculates a weighted sum of the integer pixels and coefficients. In more detail, the interpolator 920 generates the pixel value of the ¼ sub pixel c 1102 by calculating an equation $$b=\{P_{-3}*1+P_{-2}*(-5)+P_{-1}*17+P_1*58+P_2*(-10)+\\P_3*4+P_4*(-1)\}>>n.$$

Except a difference that the ¼ sub pixel d 1008 and the ¼ sub pixel 1 1016 of FIG. 10 use integer pixels disposed at the same column, the ¼ sub pixel d 1008 and the ¼ sub pixel 1 1016 may be interpolated in the same manner as the process of interpolating the ¼ sub pixel a 1101 and the ¼ sub pixel c 1102 of FIG. 11.

Figure 12:
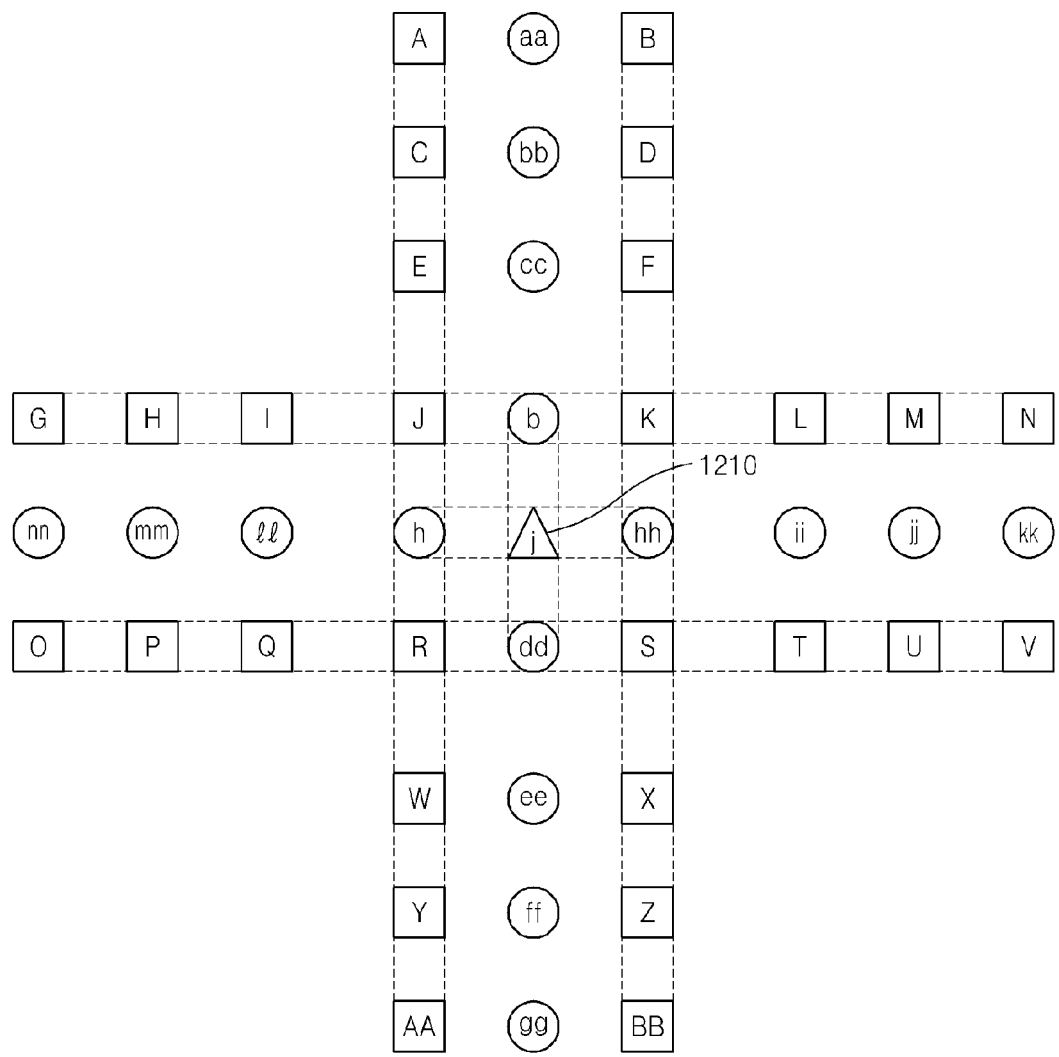
FIG. 12 is a reference view for explaining a process of interpolating a ½ sub pixel j of FIG. 10.

FIG. 12 is a reference view for explaining a process of interpolating the ½ sub pixel j 1014 of FIG. 10.

Referring to FIG. 12, the interpolation filter selector 910 selects and outputs a previously set interpolation filter from a 6 tap interpolation filter having the coefficient such as {8, −40, 160, 160, −40, 8}/256, a 8 tap interpolation filter having the coefficient such as {−1,4,−11,40,40,−11,4,−1}/64, and a 12 tap interpolation filter having the coefficient such as {−1, 8, 16, 24, −48, 161, 161, −48, 24, −16, 8, −1}/256 to interpolate a ½ sub pixel j 1210. It is assumed that the 8 tap interpolation filter having the coefficient such as {−1,4,−11,40,40,−11,4,−1}/64 is selected as the interpolation filter for interpolating the ½ sub pixel j 1210. The interpolator 920 generates a pixel value of the 1½ sub pixel j 1210 by applying the selected interpolation filter to ½ sub pixels disposed at the same column and row as the ½ sub pixel j 1210. In more detail, the interpolator 920 generates ½ sub pixels nn, mm, ll, h, hh, ii, hh, and kk disposed at the same column as the ½ sub pixel j 1210 and ½ sub pixels aa, bb, cc, b, dd, ee, ff, and gg disposed at the same row as the ½ sub pixel j 1210. As described above, the ½ sub pixels nn, mm, ll, h, hh, ii, hh, kk, aa, bb, cc, b, dd, ee, ff, and gg may be interpolated in the same manner as the process of interpolating the ½ sub pixel b 1006 and the ½ sub pixel h 1012 of FIG. 10. The interpolator 920 generates the pixel value of the ½ sub pixel j 1210 by calculating a weighted sum of the ½ sub pixels disposed at the same column and row as the ½ sub pixel j 1210 and coefficients of the selected interpolation filter. More specifically, the interpolator 920 generates the pixel value of the ½ sub pixel j 1210 by calculating an equation:

$$j=\{\{aa*(-1)+bb*4+cc*(-11)+b*40+dd*40+ee*(-11)+ff*4+gg*(-1)\}+\{nn*(-1)+mm*4+ll*(-11)+h*40+hh*40+ii*(-11)+jj*4+kk*(-1)\}\}>>n \text{ (n is an integer)}.$$

Also, the interpolator 920 may also generate the pixel value of the ½ sub pixel j 1210 by selecting one of the ½ sub pixels disposed at the same column and row as the ½ sub pixel j 1210 and calculating a weighted sum of the selected ½ sub pixel and coefficients. That is, the interpolator 920 may generate the pixel value of the ½ sub pixel j 1210 by calculating an equation $$j=\{aa*(-1)+bb*4+cc*(-11)+b*40+dd*40+ee*(-11)+ff*4+gg*(-1)\}>>n \text{ or}$$

$$j=\{nn*(-1)+mm*4+ll*(-11)+h*40+hh*40+ii*(-11)+jj*4+kk*(-1)\}>>n.$$

Figure 13:
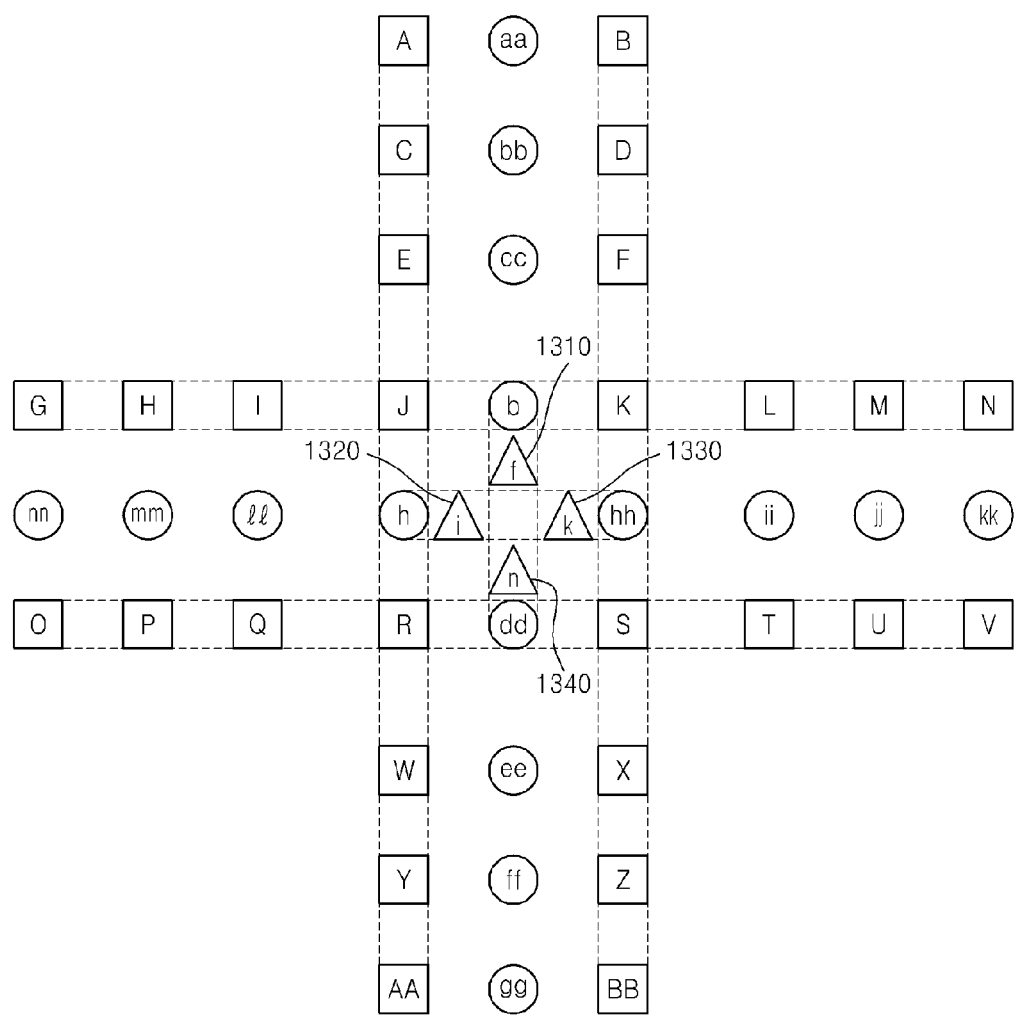
FIG. 13 is a reference view for explaining a process of interpolating a ¼ sub pixels f, I, k, and n of FIG. 10.

FIG. 13 is a reference view for explaining a process of interpolating the ¼ sub pixel f 1010, the ¼ sub pixel i 1013, the ¼ sub pixel k 1015, and the ¼ sub pixel n 1018 of FIG. 10.

Referring to FIG. 13, a process of interpolating a ¼ sub pixel f 1310 will now be described.

As described above, the interpolation filter selector 910 selects and outputs a previously set interpolation filter from a 6 tap interpolation filter having the coefficient such as {8, −32, 224, 72, −24, 8}/256, a 7 tap interpolation filter having the coefficient such as {−1,4,−10,58,17,−5,1}/64, and a 12 tap interpolation filter having the coefficient such as {−1, 5, −12, 20, −40, 229, 76, −32, 16, −8, 4, −1}/256 to interpolate the ¼ sub pixel c 1102. It is assumed that the 7 tap interpolation filter having the coefficient such as {−1,4,−10,58,17,−5,1}/64 is selected.

The interpolator 920 generates a pixel value of the ¼ sub pixel f 1310 by calculating a weighted sum of 4 ½ sub pixels aa, bb, cc, and b on the upper side and 3 ½ sub pixels dd, ee, and ff on the bottom side that are disposed at the same column as the ¼ sub pixel f 1310. As described above, the ½ sub pixels nn, mm, ll, h, hh, ii, hh, kk, aa, bb, cc, b, dd, ee, ff, and gg may be interpolated in the same manner as the process of interpolating the ½ sub pixel b 1006 and the ½ sub pixel h 1012 of FIG. 10. In more detail, the interpolator 920 generates the pixel value of the ¼ sub pixel f 1310 by calculating an equation $$f=\{aa*(-1)+bb*4+cc*(-10)+b*58+dd*17+ee*(-5)+ff*1\}>>n.$$

Next, a process of interpolating a ¼ sub pixel n 1340 will now be described.

The interpolation filter selector 910 selects and outputs a previously set interpolation filter from the 6 tap interpolation filter having the coefficient such as {8, −32, 224, 72, −24, 8}/256, the 7 tap interpolation filter having the coefficient such as {−1,4,−10,58,17,−5,1}/64, and the 12 tap interpolation filter having the coefficient such as {−1, 5, −12, 20, −40, 229, 76, −32, 16, −8, 4, −1}/256 to interpolate the ¼ sub pixel n 1340. It is assumed that the 7 tap interpolation filter having the coefficient such as {−1,4,−10,58,17,−5,1}/64 is selected.

The interpolator 920 generates a pixel value of the ¼ sub pixel n 1340 by calculating a weighted sum of 3 ½ sub pixels bb, cc, and b on the upper side and 4 ½ sub pixels dd, ee, ff, and gg on the bottom side that are disposed at the same column as the ¼ sub pixel n 1340. As described above, a coefficient {1, −5, 17, 58, −10, 4, −1}/64 that is symmetrical to the coefficient {1−1,4,−10,58,17,−5,1}/64 may be used such that pixel values of ½ sub pixels closer to the ¼ sub pixel n 1340 may be well reflected to an interpolation value. More specifically, the interpolator 920 generates the pixel value of the ¼ sub pixel n 1340 by calculating an equation $$n=\{bb*1+cc*(-5)+b*17+dd*58+ee*(-10)+ff*4+gg*(-1)\}>>n.$$

Except a difference that a ¼ sub pixel i 1320 and a ¼ sub pixel k 1330 use ½ sub pixels nn, mm, ll, h, hh, ii, jj, and kk disposed at the same row, the ¼ sub pixel i 1320 and the ¼ sub pixel k 1330 may be interpolated in the same manner as the process of interpolating the ¼ sub pixel f 1310 and the ¼ sub pixel n 1340 of FIG. 13.

Figure 14:
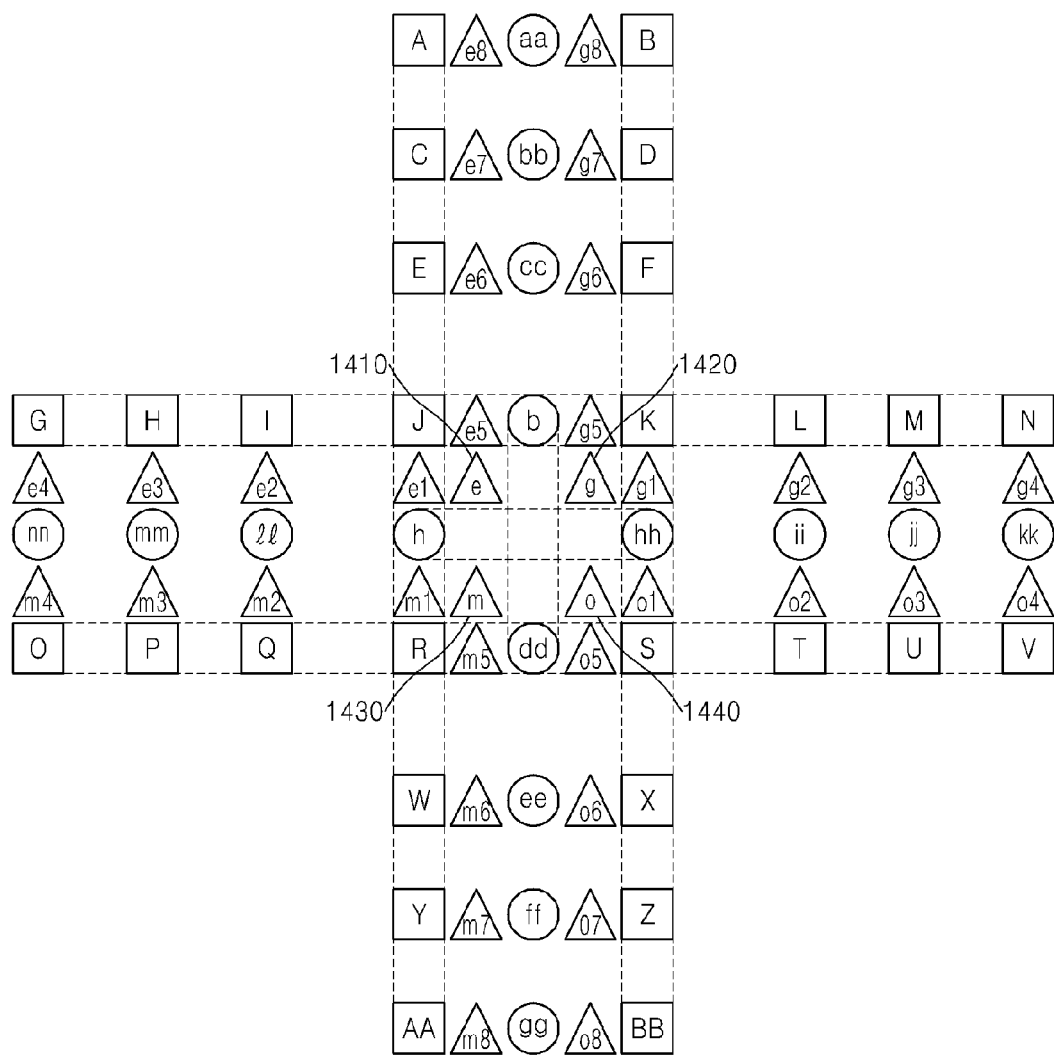
FIG. 14 is a reference view for explaining a process of interpolating a ¼ sub pixels e, g, m, and o of FIGS. 10.

FIG. 14 is a reference view for explaining a process of interpolating the ¼ sub pixel e 1009, the ¼ sub pixel g 1011, the ¼ sub pixel m 1017, and the ¼ sub pixel o 1019 of FIG. 10.

Referring to FIG. 14, a process of interpolating a ¼ sub pixel e 1410 will now be described.

As described above, the interpolation filter selector 910 selects and outputs a previously set interpolation filter from a 6 tap interpolation filter having the coefficient such as {8, −32, 224, 72, −24, 8}/256, a 7 tap interpolation filter having the coefficient such as {−1,4,−10,58,17,−5,1}/64, and a 12 tap interpolation filter having the coefficient such as {−1, 5, −12, 20, −40, 229, 76, −32, 16, −8, 4, −1}/256. It is assumed that the 7 tap interpolation filter having the coefficient such as {−1,4,−10,58,17,−5,1}/64 is selected.

The interpolator 920 generates a pixel value of the ¼ sub pixel e 1410 by applying the selected interpolation filter to ¼ sub pixels disposed at the same column and row as the ¼ sub pixel e 1410. More specifically, the interpolator 920 generates ¼ sub pixels e1 to e4 and g1 to g4 disposed at the same row as the ¼ sub pixel e 1410 and ¼ sub pixels e5 to e8 and m5 to m7 disposed at the same column as the ¼ sub pixel e 1410. As described above, the ¼ sub pixels e1 to e4, g1 to g4, e5 to e8, and m5 to m7 may be interpolated in the same manner as the ¼ sub pixel a 1005 and the ¼ sub pixel d 1008 of FIG. 10. The interpolator 920 generates the pixel value of the ¼ sub pixel e 1410 by calculating a weighted sum of the ¼ sub pixels disposed at the same column and row as the ¼ sub pixel e 1410 and coefficients of the selected interpolation filter. More specifically, the interpolator 920 generates the pixel value of the ¼ sub pixel e 1410 by calculating an equation:

$$e=\{\{e8*(-1)+e7*4+e6*(-10)+e5*58+m5*17+m6*(-5)+m7*1\}+\{e4*(-1)+e3*4+e2*(-10)+e1*58+g1*17+g2*(-5)+g3*1\}\}>>n.$$

Also, the interpolator 920 may also generate the pixel value of the ¼ sub pixel e 1410 by selecting one of the ¼ sub pixels disposed at the same column and row as the ¼ sub pixel e 1410 and calculating a weighted sum of the selected ¼ sub pixel and coefficients. That is, the interpolator 920 may generate the pixel value of the ¼ sub pixel e 1410 by calculating an equation $$e=\{e8*(-1)+e7*4+e6*(-10)+e5*58+m5*17+m6*(-5)+m71\}>>n \text{ or}$$

$$e=\{e4*(-1)+e3*4+e2*(-10)+e1*58+g1*17+g2*(-5)+g3*1\}>>n.$$

Next, a process of interpolating a ¼ sub pixel m 1430 will now be described.

The interpolation filter selector 910 selects and outputs a previously set interpolation filter from the 6 tap interpolation filter having the coefficient such as {8, −32, 224, 72, −24, 8}/256, the 7 tap interpolation filter having the coefficient such as {−1,4,−10,58,17,−5,1}/64, and the 12 tap interpolation filter having the coefficient such as {311, 5, −12, 20, −40, 229, 76, −32, 16, −8, 4, −1}/256 to interpolate the ¼ sub pixel n 1340. It is assumed that the 7 tap interpolation filter having the coefficient such as {−1,4,−10,58,17,−5,1}/64 is selected.

The interpolator 920 generates a pixel value of the ¼ sub pixel m 1430 by applying the selected interpolation filter to ¼ sub pixels disposed at the same column and row as the ¼ sub pixel m 1430. More specifically, the interpolator 920 generates ¼ sub pixels m1 to m4 and o1 to o4 disposed at the same row as the ¼ sub pixel m 1430 and ¼ sub pixels e5 to e8 and m5 to m7 disposed at the same column as the ¼ sub pixel m 1430.

As described above, the ¼ sub pixels m1 to m4, o1 to o4, e5 to e8, and m5 to m7 may be interpolated in the same manner as the process of interpolating the ¼ sub pixel a 1005 and the ¼ sub pixel 1 1016 of FIG. 10. The interpolator 920 generates the pixel value of the ¼ sub pixel m 1430 by calculating a weighted sum of the ¼ sub pixels disposed at the same column and row as the ¼ sub pixel m 1430 and coefficients of the selected interpolation filter. When the weighted sum is calculated in a column direction, a coefficient {1, −5, 17, 58, −10, 4, −1}/64 that is symmetrical to the coefficient {−1,4,−10,58,17,−5,1}/64 may be applied in the column direction such that pixel values of ¼ sub pixels closer to the ¼ sub pixel m 1430 may be well reflected to an interpolation value. More specifically, the interpolator 920 generates the pixel value of the ¼ sub pixel m 1430 by calculating an equation $$=\{\{e7*1+e6*(-5)+e5*17+m5*58+m6*(-10)+m7*4+m8*(-1)\}+\{m4*(-1)+m3*4+m2*(-10)+m1*58+o1*17+o2*(-5)+o3*11\}\}>>n.$$

Also, the interpolator 920 may also generate the pixel value of the ¼ sub pixel m 1430 by selecting one of the ¼ sub pixels disposed at the same column and row as the ¼ sub pixel m 1430 and calculating a weighted sum of the selected ¼ sub pixel and coefficients. That is, the interpolator 920 may generate the pixel value of the ¼ sub pixel m 1430 by calculating an equation $$m=\{e7*1+e6*(-5)+e5*17+m5*58+m6*(-10)+m7*4+m8*(-1)\}>>n \text{ or}$$

$$m=\{\{m4*(-1)+m3*4+m2*(-10)+m1*58+o1*17+o2*(-5)+o3*1\}>>n.$$

A ¼ sub pixel g 1420 and a ¼ sub pixel o 1440 may also be interpolated by using a weighted sum of ¼ sub pixels disposed at the same column and row as the ¼ sub pixel g 1420 and the ¼ sub pixel o 1440 and coefficients of a selected interpolation filter similarly to the process of interpolating the ¼ sub pixel e 1410 and a ¼ sub pixel m 1430.

Figure 15:
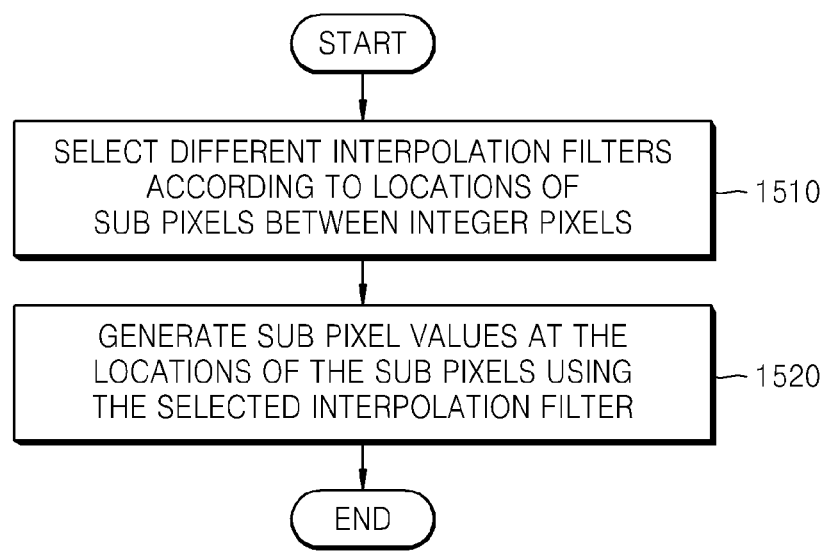
FIG. 15 is a flowchart of an image interpolation method according to an aspect of an exemplary embodiment.

FIG. 15 is a flowchart of an image interpolation method according to an aspect of an exemplary embodiment.

Referring to FIG. 15, in operation 1510, the interpolation filter selector 910 previously sets interpolation filters that are to be applied according to locations of sub pixels that are to be interpolated from among a plurality of interpolation filters having different characteristics and outputs information regarding the set interpolation filters according to a location of a sub pixel that is to be currently interpolated. As described above, the interpolation filter selector 910 previously sets interpolation filters having different tap numbers, tap coefficients, interpolation directions, and interpolation shapes according to the locations of the sub pixels and selects and outputs the set interpolation filter according to the location of the sub pixel that is to be interpolated.

In operation 1520, the interpolator 920 generates sub pixel values at the locations of the sub pixels using the selected interpolation filters.

According to an aspect of an exemplary embodiment, interpolation filters having various tap coefficients, tap numbers, interpolation directions, and interpolation shapes may be applied, and thus interpolation may be more efficiently performed according to an image characteristic. When a more enhanced interpolation picture is used, prediction efficiency of a motion prediction may increase, thereby increasing image compression efficiency.

Exemplary embodiments may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the inventive concept been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An image interpolation method comprising:
   selecting an interpolation filter from among different interpolation filters according to locations of sub pixels between integer pixels; and
   generating sub pixel values at the locations of the sub pixels using the selected interpolation filters,
   wherein, the selecting the interpolation filter comprises:
   when a sub pixel is located on ½ sub pixel, selecting a 8-tap interpolation filter having a coefficient {−1,4,−,40,40,−11,4,−1},
   wherein the image is split into a plurality of maximum coding units according to information about the maximum size of the coding unit,
   the maximum coding unit is hierarchically split into one or more coding units of depths including at least one of a current depth and a lower depth according to split information,
   when the split information indicates a split for the current depth, the coding unit of a current depth is split into four coding units of a lower depth, independently from neighboring coding units, and
   when the split information indicates a non-split for the current depth, one or more prediction units are obtained from the coding unit of the current depth.

* * * * *